US010167944B2

(12) United States Patent
Kwasniewski et al.

(10) Patent No.: US 10,167,944 B2
(45) Date of Patent: Jan. 1, 2019

(54) AXLE ASSEMBLY HAVING A LUBRICANT RESERVOIR

(71) Applicant: ArvinMeritor Technology, LLC, Troy, MI (US)

(72) Inventors: Dale Kwasniewski, Galesburg, MI (US); Andrew Bodary, Shelby Township, MI (US); Adam Joyce, Livonia, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 356 days.

(21) Appl. No.: 15/235,779

(22) Filed: Aug. 12, 2016

(65) Prior Publication Data

US 2018/0045298 A1    Feb. 15, 2018

(51) Int. Cl.
| | |
|---|---|
| *F16H 57/04* | (2010.01) |
| *F16H 48/08* | (2006.01) |
| *F16H 57/021* | (2012.01) |
| *F16H 57/037* | (2012.01) |

(52) U.S. Cl.
CPC ......... *F16H 57/0483* (2013.01); *F16H 48/08* (2013.01); *F16H 57/021* (2013.01); *F16H 57/037* (2013.01); *F16H 57/045* (2013.01); *F16H 57/0409* (2013.01); *F16H 57/0423* (2013.01); *F16H 57/0457* (2013.01)

(58) Field of Classification Search
CPC ............. F16H 57/0483; F16H 57/0423; F16H 57/0457; F16H 57/0409; F16H 57/045
See application file for complete search history.

(56) References Cited

U.S. PATENT DOCUMENTS

| | | | |
|---|---|---|---|
| 2,242,195 A | | 5/1941 | Teker et al. |
| 3,025,716 A | * | 3/1962 | Muller ................ F16H 57/0482 277/575 |
| 4,068,541 A | * | 1/1978 | Sakamoto .............. B60K 17/16 74/606 R |
| 4,594,912 A | * | 6/1986 | Ishikawa ................ B60B 35/16 74/606 R |
| 5,540,300 A | | 7/1996 | Downs et al. |
| 6,132,329 A | | 10/2000 | Tison |
| 6,135,241 A | * | 10/2000 | Ganguly ............. F16H 57/0483 184/11.1 |
| 8,858,381 B2 | | 10/2014 | Trost |

(Continued)

FOREIGN PATENT DOCUMENTS

| | | |
|---|---|---|
| DE | 710894 C | 9/1941 |
| EP | 1375970 A2 | 1/2004 |

(Continued)

OTHER PUBLICATIONS

European Patent Office, Extended European Search Report for the corresponding European Patent Application No. 17184400.4, dated Feb. 19, 2018.

(Continued)

*Primary Examiner* — Erin D Bishop
(74) *Attorney, Agent, or Firm* — Brooks Kushman P.C.

(57) ABSTRACT

An axle housing having a lubricant reservoir. An arm portion of an axle housing and a dam may cooperate to define a reservoir that retains lubricant in the arm portion. A conduit or a deflector may be provided to direct lubricant that is sprayed by a ring gear to the reservoir.

19 Claims, 6 Drawing Sheets

(56) References Cited

U.S. PATENT DOCUMENTS 8,974,342 B2    3/2015   Kwasniewski et al.
9,267,596 B2    2/2016   Trost

FOREIGN PATENT DOCUMENTS

| | | |
|---|---|---|
| EP | 2660493 A1 | 11/2013 |
| EP | 3098478 A2 | 11/2016 |
| GB | 2054485 A | 2/1981 |
| JP | S5937462 U | 3/1984 |
| JP | 2012210839 A | 11/2012 |
| WO | 2015141783 A1 | 9/2015 |

OTHER PUBLICATIONS

United States Patent and Trademark Office, U.S. Appl. No. 14/696,542, filed Apr. 27, 2015.
United States Patent and Trademark Office, U.S. Appl. No. 14/851,004, filed Sep. 11, 2015.
United States Patent and Trademark Office, U.S. Appl. No. 14/853,309, filed Sep. 14, 2015.
United States Patent and Trademark Office, U.S. Appl. No. 14/868,623, filed Sep. 29, 2015.
United States Patent and Trademark Office, U.S. Appl. No. 15/077,970, filed Mar. 23, 2016.

* cited by examiner

AXLE ASSEMBLY HAVING A LUBRICANT RESERVOIR

TECHNICAL FIELD

This disclosure relates to an axle assembly that has a lubricant reservoir.

BACKGROUND

An axle assembly having a lubricant reservoir is disclosed in U.S. Pat. No. 8,858,381.

SUMMARY

In at least one embodiment, an axle assembly is provided. The axle assembly may include an axle housing and a dam. The axle housing may have a center portion and an arm portion. The center portion may receive a differential. The arm portion may extend from the center portion and may receive an axle shaft. The dam may be disposed in the axle housing and may cooperate with the arm portion to define a reservoir that retains lubricant in the arm portion. The dam may have a dam panel and a brace panel. The dam panel may extend from the arm portion. The brace panel may extend from the dam panel to the center portion. Lubricant may flow from the reservoir to the center portion by flowing through an orifice in the dam panel and around the brace panel.

In at least one embodiment, an axle assembly is provided. The axle assembly may include an axle housing, a first dam, a second dam, and a deflector. The axle housing may have a center portion, a first arm portion, and a second arm portion. The center portion may receive a differential that has a ring gear. The first arm portion may extend from the center portion and may receive a first axle shaft. The second arm portion may extend from the center portion and may receive a second axle shaft. The first dam may be disposed in the axle housing and may cooperate with the first arm portion to define a first reservoir that retains lubricant in the first arm portion. The second dam may be disposed in the axle housing and may cooperate with the second arm portion to define a second reservoir that retains lubricant in the second arm portion. The deflector may be disposed in the center portion above the ring gear. The deflector may have a divider horn that may be at least partially defined by a first external arcuate surface and a second external arcuate surface. The first external arcuate surface may direct lubricant that is sprayed by the ring gear toward the first reservoir. The second external arcuate surface may be disposed opposite the first external arcuate surface. The second external arcuate surface may direct lubricant that is sprayed by the ring gear toward the second reservoir.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
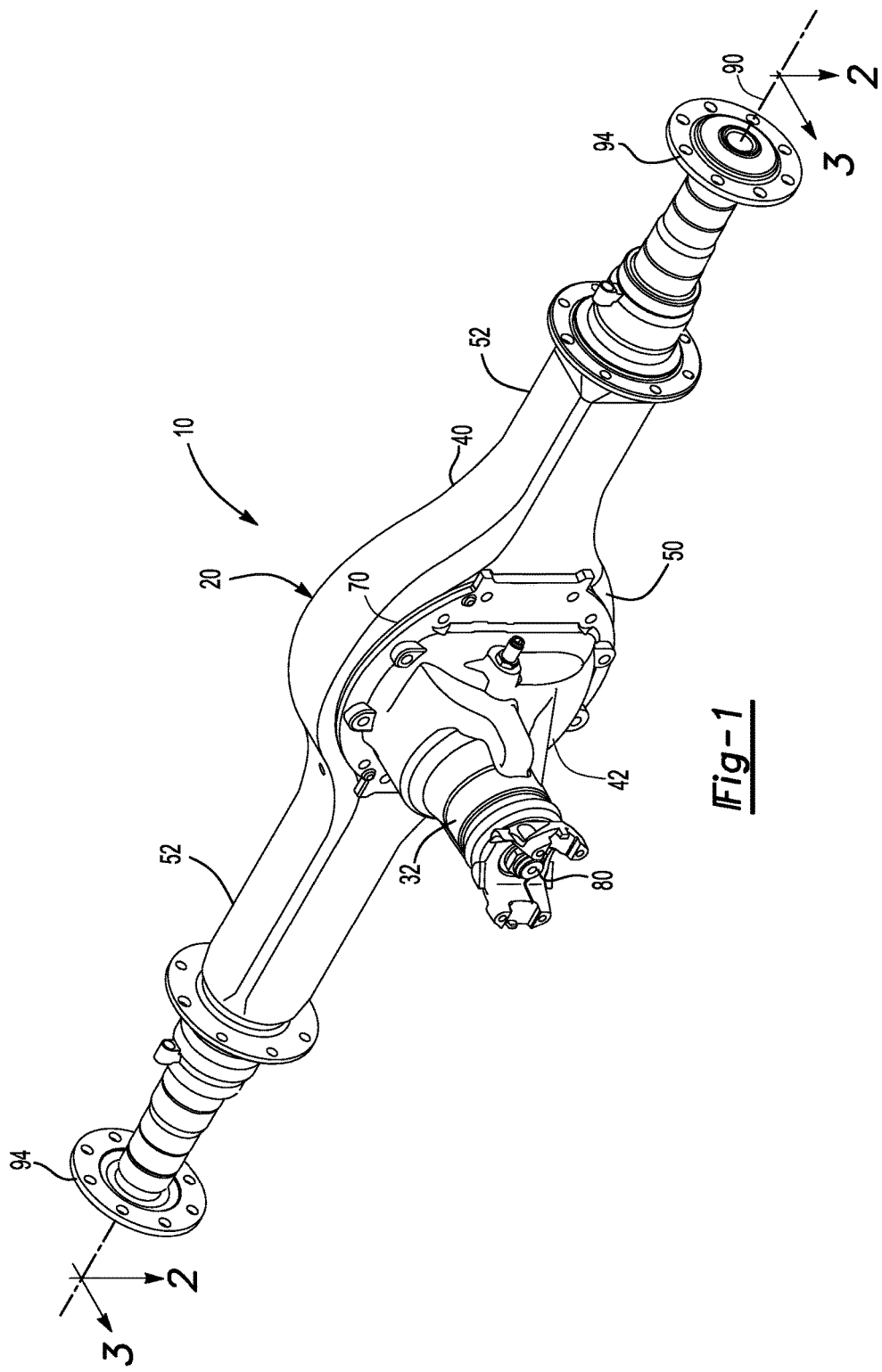
FIG. 1 is a perspective view of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

Figure 6:
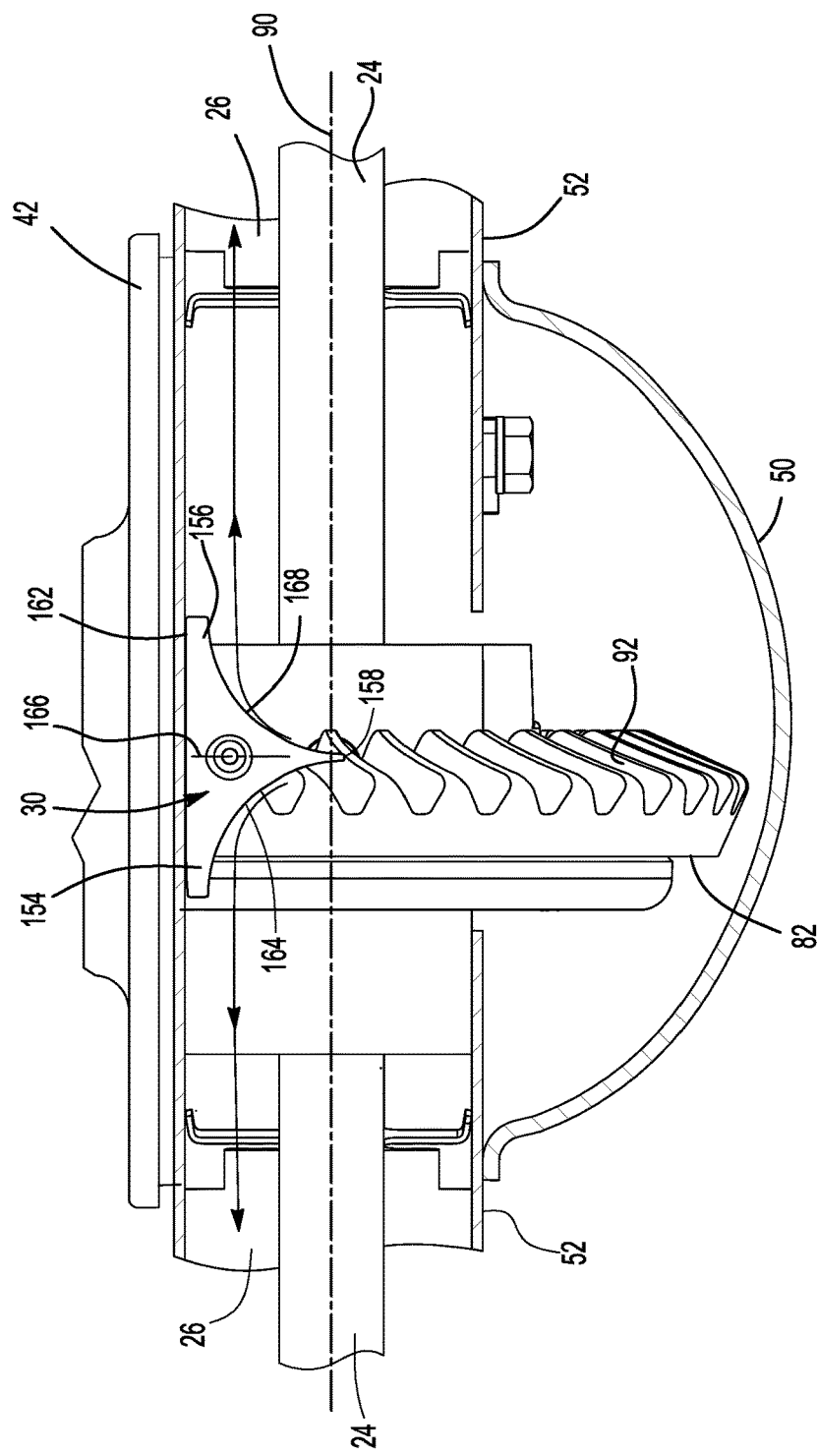
FIG. 6 is a fragmentary top view of the axle assembly showing a deflector.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 may be a single drive axle assembly or may be configured as part of a tandem axle configuration or multi-axle configuration that may include a plurality of axle assemblies that may be connected in series. As is best shown with reference to FIGS. 1 and 2, the axle assembly 10 may include a housing assembly 20, a differential 22, at least one axle shaft 24, at least one dam 26. The axle assembly 10 may also include either a lubricant conduit 28, which is best shown in FIG. 3, or a deflector 30, which is best shown in FIG. 6.

Figure 2:
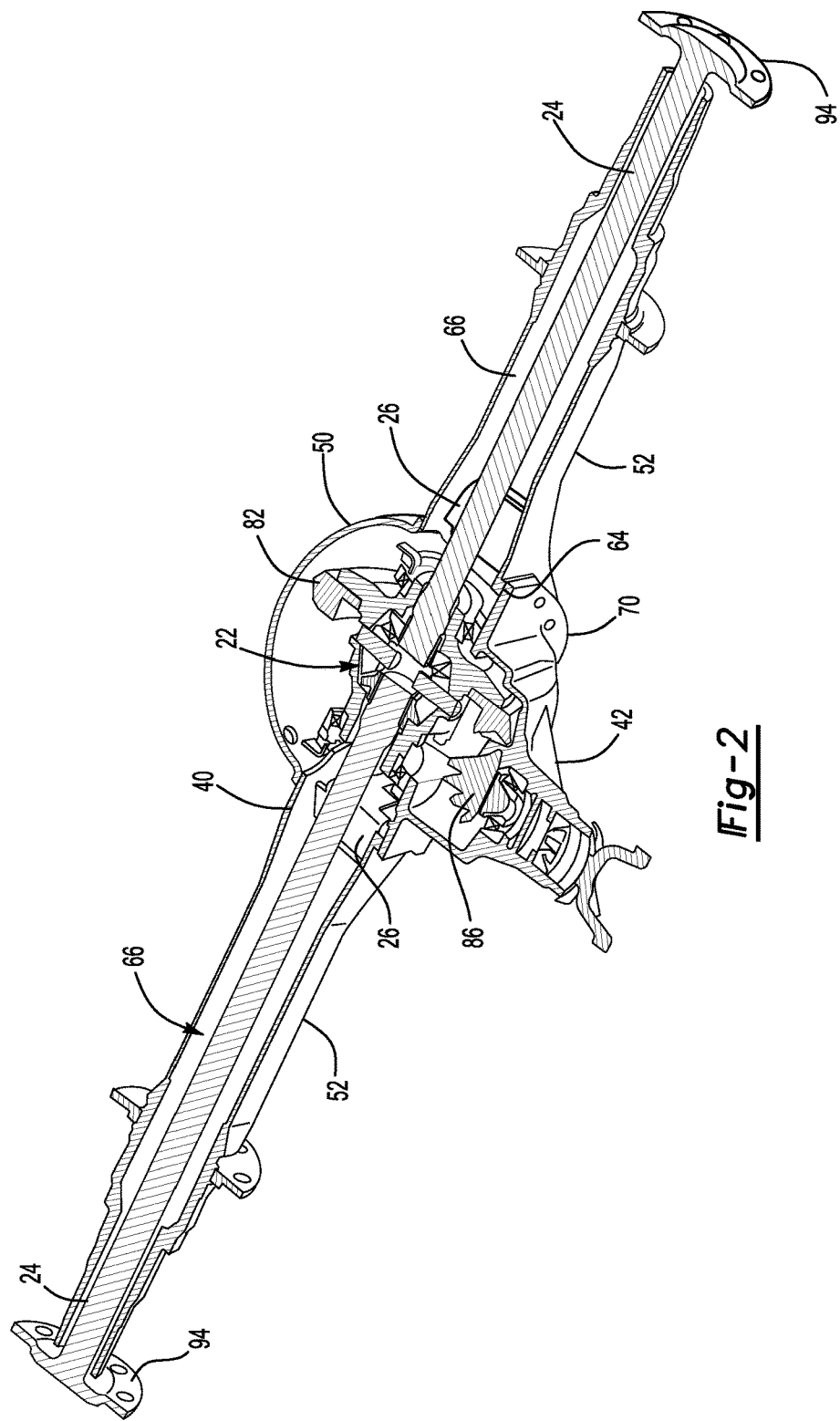
FIG. 2 is a section view of the axle assembly along section line 2-2.
Figure 3:
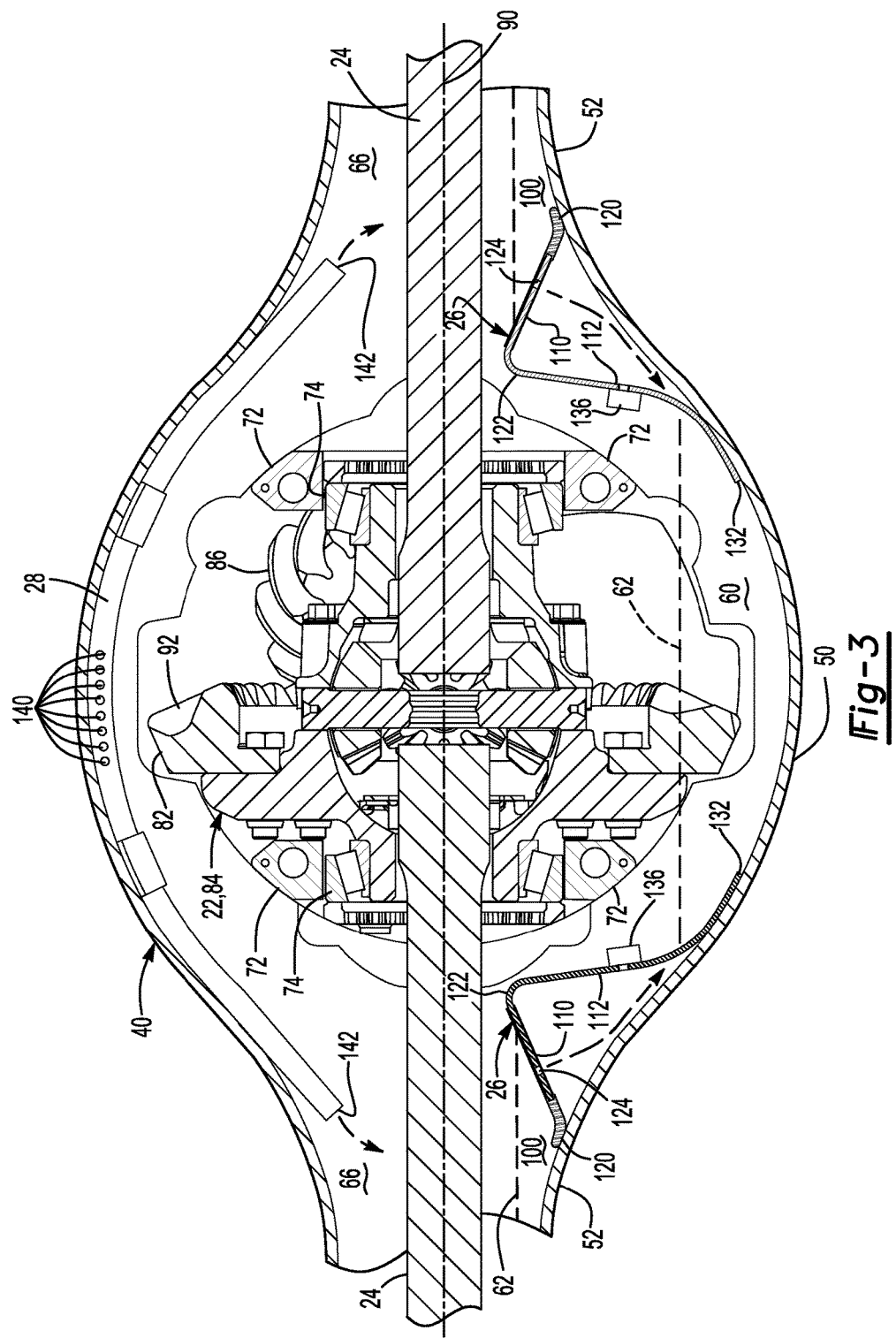
FIG. 3 is a section view of the axle assembly along section line 3-3.

Referring to FIGS. 1 and 2, the housing assembly 20 may receive various components of the axle assembly 10. In addition, the housing assembly 20 may facilitate mounting of the axle assembly 10 to the vehicle. The housing assembly 20 may include an axle housing 40 and a differential carrier 42.

The axle housing 40 may receive and support the axle shafts 24. In at least one embodiment, the axle housing 40 may include a center portion 50 and at least one arm portion 52.

The center portion 50 may be disposed proximate the center of the axle housing 40. The center portion 50 may define a cavity that may receive the differential 22 and at least a portion of the dam 26. As is best shown in FIG. 3, a region of the center portion 50 or cavity located below the differential 22 may at least partially define a sump portion 60 that may contain lubricant 62. Splashed lubricant may flow down the sides of the center portion 50 and may flow over internal components of the axle assembly 10 and gather in the sump portion 60.

The lubricant 62, which may be a liquid such as oil, may lubricate components of the axle assembly 10, such as the differential 22 and various bearings. In FIG. 3, the level of the lubricant 62 in the arm portions 52 and the sump portion 60 is represented by the dashed lines. The lubricant levels are merely exemplary and may be higher or lower than what is depicted.

Referring to FIG. 2, center portion 50 may also include a carrier mounting surface 64. The carrier mounting surface 64 may face toward and may engage the differential carrier 42. The carrier mounting surface 64 may facilitate mounting of the differential carrier 42 to the axle housing 40. For example, the carrier mounting surface 64 may have a set of holes that may be aligned with corresponding holes on the differential carrier 42. Each hole may receive a fastener, such as a bolt, that may couple the differential carrier 42 to the axle housing 40.

Referring to FIGS. 1 and 2, one or more arm portions 52 may extend from the center portion 50. For example, two arm portions 52 may extend in opposite directions from the center portion 50 and away from the differential 22. The arm portions 52 may have substantially similar configurations. For example, the arm portions 52 may each have a hollow configuration or tubular configuration that may extend around the corresponding axle shaft 24 and may help separate or isolate the axle shaft 24 from the surrounding environment. An arm portion 52 or a portion thereof may be integrally formed with the center portion 50. Alternatively, an arm portion 52 may be separate from the center portion 50. In such a configuration, each arm portion 52 may be attached to the center portion 50 in any suitable manner, such as by welding or with one or more fasteners. Each arm portion 52 may define an arm cavity 66 that may receive a corresponding axle shaft 24. The arm portion 52 and arm cavity 66 may be disposed above the sump portion 60 in one or more embodiments.

Referring to FIG. 2, the differential carrier 42, which may also be called a carrier housing, may be mounted to the center portion 50 of the axle housing 40. The differential carrier 42 may support components of the differential 22. In at least one embodiment, the differential carrier 42 may have a flange portion 70 and a bearing support 72, which is best shown in FIG. 3.

Referring to FIGS. 1 and 2, the flange portion 70 may facilitate mounting of the differential carrier 42 to the axle housing 40. For example, the flange portion 70 may be disposed proximate and may engage the carrier mounting surface 64 of the axle housing 40 and may have a set of holes that may receive fasteners as previously discussed.

Referring to FIG. 3, the bearing support 72 may receive a roller bearing assembly 74 that may rotatably support the differential 22. In FIG. 2, two bearing supports 72 are shown that are located inside the center portion 50 proximate opposite sides of the differential 22. A bearing support 72 may include a pair of legs that extend from the differential carrier 42. A bearing cap may be mounted to the legs and that may arch over a roller bearing assembly 74. The bearing support 72 and bearing cap may cooperate to extend around the roller bearing assembly 74 and may cooperate to receive and secure the roller bearing assembly 74.

Referring to FIGS. 2 and 3, the differential 22 may be disposed in the center portion 50 of the housing assembly 20. The differential 22 may transmit torque to the vehicle traction wheel assemblies and permit the traction wheel assemblies to rotate at different velocities. An input shaft 80 (which is best shown in FIG. 1), a ring gear 82, and a differential unit 84 are shown to facilitate an abbreviated discussion of the operation of the axle assembly 10 and the differential 22.

The input shaft 80 may be coupled to a vehicle drivetrain component, such as a drive shaft, that may be coupled to an output of a vehicle transmission or transfer case, which in turn may receive torque from a vehicle power source, such as an engine or motor. Alternatively, the input shaft 80 may be operatively connected to an output of another axle assembly. The input shaft 80 may be rotatably supported by one or more roller bearings that may be disposed on the differential carrier 42 and may be operatively connected to a drive pinion 86 or integrally formed with the drive pinion 86. The drive pinion 86 may provide torque to the ring gear 82.

Referring to FIG. 3, the ring gear 82 may transmit torque the differential unit 84. For instance, the ring gear 82 may be fixedly mounted to the differential unit 84. The ring gear 82 may rotate about an axis 90 and may have a set of teeth 92 that may arranged around the axis 90. The ring gear 82 may splash lubricant 62 that accumulates in the sump portion 60 as it rotates.

The differential unit 84 may be generally disposed in the center portion 50 of the axle housing 40 and may be configured to permit the axle shafts 24 to rotate at different speeds. As is best shown in FIG. 3, the differential unit 84 may be rotatably supported by a pair of roller bearing assemblies 74 and may be operatively connected to the axle shafts 24. As such, the differential unit 84 may receive torque from the ring gear 82 and provide torque to the axle shafts 24.

The axle shafts 24 may transmit torque from the differential 22 to corresponding traction wheel assemblies. In FIG. 2, two axle shafts 24 are provided such that each axle shaft 24 extends through a different arm cavity 66. The axle shafts 24 may extend along and may be rotated about the axis 90 by the differential 22. Each axle shaft 24 may have a first end and a second end. The first end may be coupled to the differential 22. The second end may be disposed opposite the first end and may be operatively connected to a wheel end assembly that may have a wheel hub that may support a wheel. As shown in FIG. 1, an axle flange 94 may be disposed proximate the second end of the axle shaft 24 and may facilitate coupling of the axle shaft 24 to the wheel hub.

Referring to FIGS. 2 and 3, a dam 26 may be disposed in the axle housing 40 and may help capture or store a volume of lubricant 62 in the arm cavity 66 remotely from the sump portion 60. The dam 26 may be fixedly disposed on the axle housing 40 and may cooperate with the arm cavity 66 to at least partially define a reservoir 100. The reservoir 100 may be configured to store a volume of lubricant 62 in the arm portion 52. Storing lubricant 62 in the reservoir 100 may reduce the amount of lubricant 62 in the sump portion 60. Reducing the volume of lubricant 62 in the sump portion 60 may reduce churning losses or frictional drag that may be exerted upon the ring gear 82 by the lubricant 62 and may improve operating efficiency of the axle assembly 10 and vehicle fuel economy. In addition, lubricant 62 in the reservoir 100 may lubricate a roller bearing assembly that may rotatably support the axle shaft 24 and that may be located near the end of the arm portion 52 that is disposed opposite the center portion 50.

A dam 26 may be associated with each arm portion 52. For convenience in reference, a dam 26 that is disposed in a first arm portion 52 may be referred to as a first dam 26 while the dam 26 that is disposed in a second arm portion 52 may be referred to as a second dam 26. The first dam 26 may cooperate with the first arm portion 52 to define a first reservoir 100 that may retain lubricant 62 in the first arm portion 52. Similarly, the second dam 26 may cooperate with the second arm portion 52 to define a second reservoir 100 that may retain lubricant 62 in the second arm portion 52.

Referring to FIG. 3, each dam 26 may be completely disposed below an axle shaft 24 that extends through the arm portion 52 that receives the dam 26.

Figure 4:
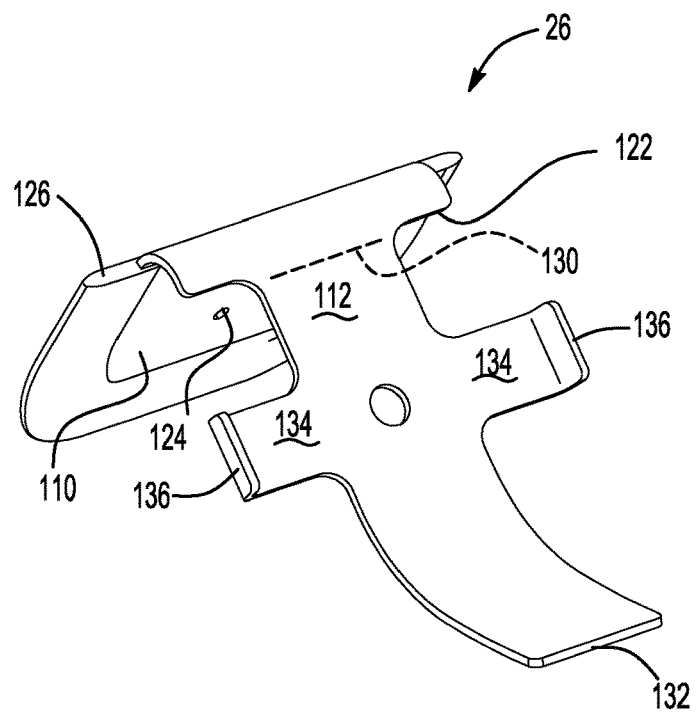
FIGS. 4 and 5 are perspective views of a dam that may be provided with the axle assembly.
Figure 5:
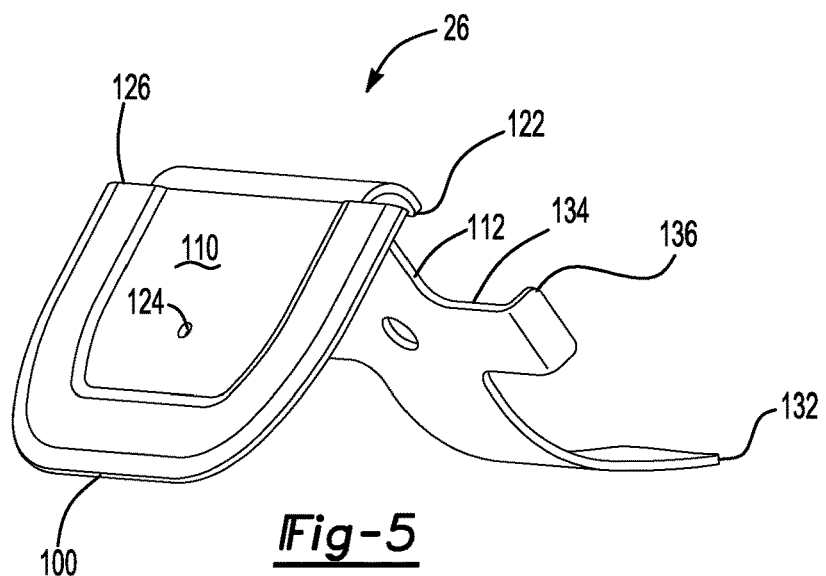

Referring to FIGS. 4 and 5, an example of a dam 26 is shown. The dam 26 may include a dam panel 110 and a brace panel 112.

Referring to FIGS. 3-5, the dam panel 110 may be at least partially received in an arm portion 52 and may partially define a reservoir 100. More specifically, the dam panel 110 may be disposed below an axle shaft 24 and may extend upwardly from a bottom or bottom surface of the arm portion 52 toward the differential 22. The dam panel 110 may also extend between opposing lateral sides of the arm portion 52 that may extend upwardly from the bottom or bottom surface. The dam panel 110 may include a first dam panel end 120, a second dam panel end 122, an orifice 124, and a seal 126.

The first dam panel end 120 may be disposed proximate the bottom or bottom surface of the arm portion 52. The first dam panel end 120 may engage the bottom surface in configurations where the dam 26 is not provided with a seal 126.

The second dam panel end 122 may be disposed opposite the first dam panel end 120. The second dam panel end 122 may be disposed proximate the top of the dam 26 and may be located near the differential 22. As is best shown in FIG. 3, the second dam panel end 122 may be disposed above the first dam panel end 120 and may be disposed in the center portion 50. Lubricant 62 that overtops the dam 26 may flow over the second dam panel end 122 to return to the sump portion 60.

The orifice 124 may permit lubricant 62 to flow through the dam panel 110 to return to the sump portion 60. The orifice 124 may be a through hole that may extend through the dam panel 110. In the embodiment shown in FIGS. 4 and 5, one orifice 124 is provided; however, it is contemplated that multiple orifices may be provided in one or more embodiments. The orifice 124 may be disposed between the first dam panel end 120 and the second dam panel end 122. Positioning the orifice 124 above the first dam panel end 120 may help retain some lubricant 62 in an associated lubricant reservoir 100 even after the reservoir 100 is drained down to the orifice level.

The orifice 124 may be sized to control the rate at which lubricant 62 exits the reservoir 100 and returns to the sump portion 60. For example, the orifice 124 may be sized to provide a lubricant flow rate that is less than a fill rate (e.g., rate at which splashed lubricant 62 is provided to the reservoir 100) at sufficiently high ring gear rotational speeds. As such, more lubricant 62 may be stored in a reservoir 100 at higher ring gear rotational speeds to reduce parasitic drag forces on the ring gear 82.

The seal 126, if provided, inhibit leakage between the dam panel 110 and the arm portion 52. The seal 126 may be made of any suitable material, such as a polymeric material or an elastomeric material such as rubber. As is best shown in FIG. 5, the seal 126 may extend around one or more sides of the dam panel 110 that may be disposed proximate the arm portion 52. For example, the seal 126 may extend around the bottom and left and right lateral sides of the dam panel 110.

Referring to FIGS. 3-5, the brace panel 112 may extend from the dam panel 110. The brace panel 112 may be received in the center portion 50 and may help support the dam panel 110. The brace panel 112 may include a first brace panel end 130, a second brace panel end 132, and one or more side arms 134.

The first brace panel end 130 may be disposed proximate and may extend from the second dam panel end 122. As such, the first brace panel end 130 may be disposed proximate the top of the dam 26 and may be located above the sump portion 60.

Referring to FIG. 3, the second brace panel end 132 may be disposed opposite the first brace panel end 130. The second brace panel end 132 may be disposed in the sump portion 60 and may be disposed proximate or may engage the bottom of the center portion 50. The second brace panel end 132 of the first dam 26 may be spaced apart from and may not engage the second brace panel end 132 of the second dam 26. As such, the brace panel 112 may terminate in the sump portion 60 and may not extend completely across the bottom of the center portion 50. For example, the brace panel 112 may be spaced apart from and may terminate directly below the bearing support 72. As such, the brace panel 112 may not extend under the ring gear 82.

Referring to FIG. 4, one or more side arms 134 may extend from the brace panel 112. The side arms 134 may be disposed between and may be spaced apart from the first brace panel end 130 and the second brace panel end 132. In FIG. 4, a pair of side arms 134 is shown that are disposed opposite each other. As such, the brace panel 112 may have a generally cross-shaped configuration. The side arms 134 may extend toward and may engage lateral sides of the axle housing 40 to inhibit lateral movement of the dam 26 with respect to the axle housing 40. Each side arm 134 may also include a flange 136 that may be disposed at an end of each side arm 134 and may extend inwardly toward the differential 22 and the ring gear 82. The side arms 134 may be spaced apart from and may not engage the bottom of the center portion 50. As such, lubricant 62 that exits an associated reservoir 100 via the orifice 124 may flow under one or more side arms 134 to return to the sump portion 60.

Referring to FIGS. 3 and 6, a lubricant conduit 28 or a deflector 30 may be provided to direct lubricant 62 to one or more reservoirs 100. The lubricant conduit 28 may internally direct or route the lubricant 62 to a reservoir 100. The deflector 30 may externally direct or route the lubricant 62 to a reservoir 100 without the use of an internal passage.

Referring to FIG. 3, the lubricant conduit 28 may receive the lubricant 62 and internally route the lubricant 62 to an arm portion 52 and an associated lubricant reservoir 100. More specifically, the lubricant conduit 28 may be configured to receive or capture lubricant 62 that is splashed or sprayed inside the axle housing 40 by the ring gear 82. The lubricant conduit 28 may be spaced apart from the ring gear 82 so as to not interfere with rotation of the ring gear 82 or strip the lubricant 62 from the ring gear surfaces.

The lubricant conduit 28 may have any suitable configuration. For instance, the lubricant conduit 28 or a portion thereof may be configured as a groove, tube, hose, pipe, or channel that may have an internal passage that may receive lubricant 62 that is sprayed or splashed by the ring gear 82 or that drips down an interior surface of the center portion 50 into the lubricant conduit 28. The lubricant conduit 28 may be integrally formed with the axle housing 40 or may be provided as a separate component that may be coupled to the axle housing 40 in any suitable manner, such as with an adhesive, weld, a mounting bracket, fastener, or the like. In addition, a lubricant conduit 28 or a portion thereof may slope downwardly from the center portion 50 of the axle housing 40 toward an arm portion 52 to facilitate the flow of lubricant 62 to the arm portion 52.

The lubricant conduit 28 may route the lubricant 62 to one or more arm portions 52. For instance, a single lubricant conduit 28 may be provided that has opposing ends that terminate at different arm portions 52 as depicted in FIG. 3. Alternatively, a lubricant conduit 28 may provide lubricant 62 to a single arm portion 52. In addition, the lubricant conduit 28 may be disposed above the axle shaft 24 and/or at least partially disposed above the dam 26.

The lubricant conduit 28 may be provided in various configurations. For example, a lubricant conduit 28 may include one or more inlets 140 and one or more outlets 142.

One or more inlets 140 may be disposed in the cavity of the center portion 50 any may receive lubricant 62 that is sprayed by the ring gear 82. An inlet 140 may be configured as a through hole that may extend through the lubricant conduit 28 to an internal passage. In FIG. 3, a plurality of inlets 140 are shown that are spaced apart from each other. The inlets 140 may be positioned above the ring gear 82. For instance, one or more inlets 140 may be disposed directly above the ring gear 82. One or more inlets 140 that may not be disposed directly above the ring gear 82 may be positioned along the lubricant conduit 28 in a direction that extends away from a back side or mounting side of the ring gear 82 and are disposed closer to the teeth 92 of the ring gear 82 to receive lubricant 62 that may be sprayed at an angle away from the teeth 92 or to the right from the perspective shown in FIG. 3. The inlets 140 may be oriented in a direction that is disposed opposite the direction of rotation of the ring gear 82. In addition, one or more inlets 140 may be disposed horizontally or in a direction that may be disposed substantially perpendicular to the axis 90.

One or more outlets 142 may be spaced apart from the inlet 140 and may terminate at or near a dam 26. More specifically, an outlet 142 may be configured to deliver lubricant 62 to a region of the arm portion 52 that is located along a side of the dam 26 that faces away from the differential 22. In the configuration shown in FIG. 3, the lubricant conduit 28 has a first outlet 142 and a second outlet 142. The first outlet 142 may provide lubricant 62 to the first reservoir 100. The second outlet 142 may be disposed opposite the first outlet 142 and may provide lubricant 62 to the second reservoir 100.

Figure 7:
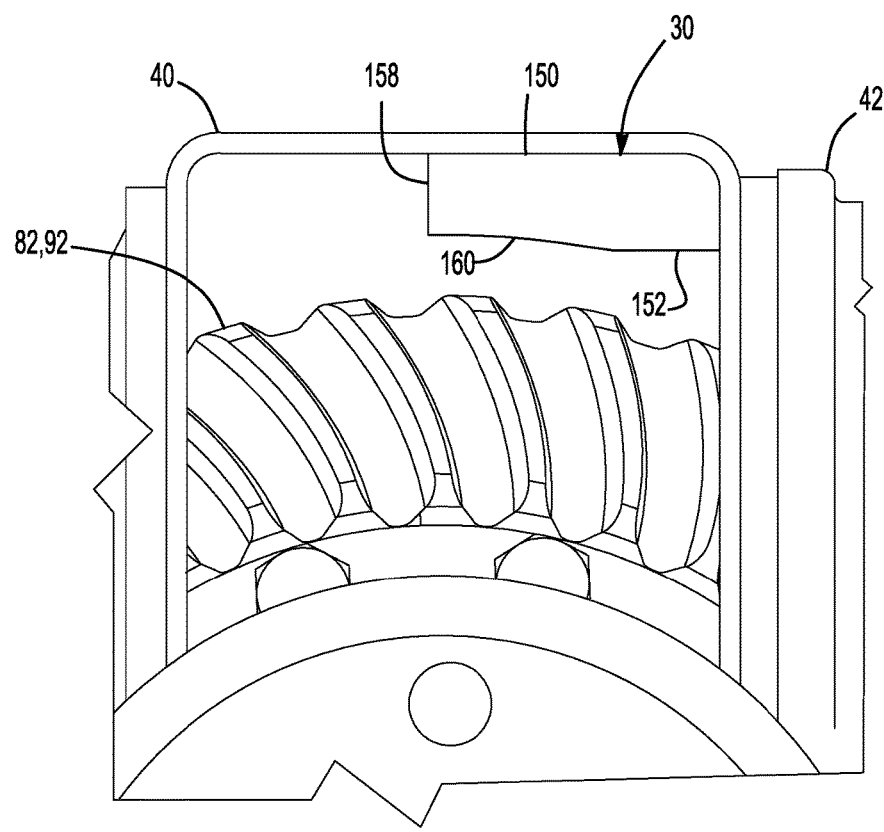
FIG. 7 is a fragmentary side view of the axle assembly showing the deflector.
Figure 8:
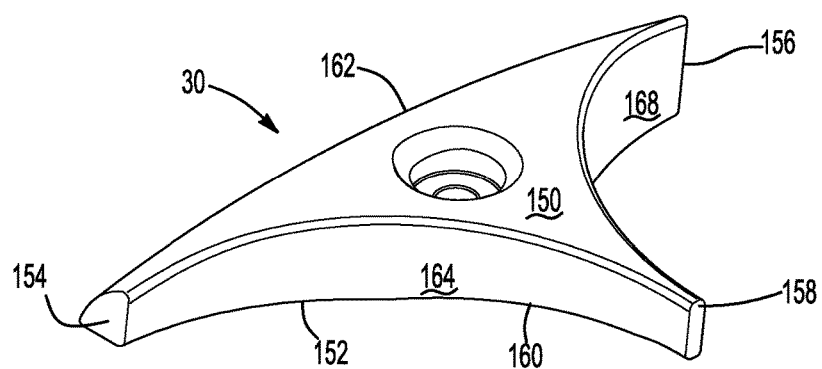
FIG. 8 is a perspective view of the deflector.

Referring to FIGS. 6-8, the deflector 30 may be provided to direct splashed lubricant toward at least one lubricant reservoir 100. As is best shown in FIG. 6, the deflector 30 may be positioned above a dam 26 at a location where the deflector 30 may redirect lubricant 62 that is splashed by the ring gear 82 over the dam 26 and into the lubricant reservoir 100, as is represented by the curved arrowed lines shown in FIG. 6. For example, the deflector 30 may be disposed in the center portion 50 of the axle housing 40 above the ring gear 82.

The deflector 30 may be mounted to the axle housing 40 in any suitable manner. For instance, the deflector 30 may be mounted to an interior surface of the axle housing 40 with an adhesive, weld, a fastener or the like. In the configuration shown, the deflector 30 has a hole that may be configured to receive a fastener that may couple the deflector 30 to the axle housing 40.

The deflector 30 may generally have a tricorn configuration or three-horn configuration that may include an upper surface 150, a lower surface 152, a first horn 154, a second horn 156, and a divider horn 158.

Referring to FIGS. 7 and 8, the upper surface 150 may face away from the ring gear 82. In addition, the upper surface 150 may be disposed proximate the axle housing 40. For instance, the upper surface 150 may engage an interior surface of the axle housing 40 in one or more embodiments.

The lower surface 152 may be disposed opposite the upper surface 150. As such, the lower surface 152 may face toward the ring gear 82. As is best shown in FIG. 7, the lower surface 152 may optionally include a curved portion 160. The curved portion 160 may extend along an arc. The arc may be radially disposed with respect to the axis 90. As such, the curved portion 160 may be disposed substantially parallel to the outside circumference of the ring gear 82.

Referring to FIGS. 6 and 8, the first horn 154 may extend toward the first reservoir 100. In addition, the first horn 154 may extend from the upper surface 150 to the lower surface 152. The first horn 154 may also extend between a back side 162 and a first external arcuate surface 164.

The back side 162 may be disposed proximate and may engage the axle housing 40. For example, the back side 162 may engage an internal side or internal surface of the axle housing 40 that may be disposed opposite the differential carrier 42. Positioning the back side 162 against the axle housing 40 may help position and inhibit movement of the deflector 30 with respect to the axle housing 40. The back side 162 may extend from the upper surface 150 to the lower surface 152 and may extend from the first horn 154 to the second horn 156. As such, the back side 162 may be disposed opposite the divider horn 158.

Referring to FIG. 6, the first external arcuate surface 164 may direct lubricant 62 that is sprayed by the ring gear 82 toward the first dam 26 and the first reservoir 100. The first external arcuate surface 164 may extend from the upper surface 150 to the lower surface 152. In addition, the first external arcuate surface 164 may extend along a curve or an arc from an end of the first horn 154 to an end of the divider horn 158. As one example, the curve or arc of the first external arcuate surface 164 may have a constant radius. As another example, the curve or arc of the first external arcuate surface 164 may extend approximately 90° so as to direct lubricant substantially perpendicular to the back side of the ring gear 82. In such a configuration, an end of the first external arcuate surface 164 that is disposed proximate the divider horn 158 may be disposed substantially perpendicular to the axis 90 while an opposite end that is disposed proximate an end of the first horn 154 may face toward the first reservoir 100 and may be disposed substantially parallel to the axis 90.

As is best shown in FIG. 6, the first external arcuate surface 164 may be entirely disposed on one side of a center plane 166 of the deflector 30. The center plane 166 may be disposed substantially perpendicular to the axis 90 and substantially perpendicular to the back side 162 of the deflector 30. In addition, the center plane 166 may extend along the center of the divider horn 158. As such, the first external arcuate surface 164 may be disposed between the center plane 166 and the first dam 26.

The second horn 156 may be disposed opposite the first horn 154. The second horn 156 may extend toward the second reservoir 100. In addition, the second horn 156 may extend from the upper surface 150 to the lower surface 152. The second horn 156 may also extend between the back side 162 of the deflector 30 and a second external arcuate surface 168.

The second external arcuate surface 168 may direct lubricant 62 that is sprayed by the ring gear 82 toward the second dam 26 and the second reservoir 100. The second external arcuate surface 168 may extend from the upper surface 150 to the lower surface 152. In addition, the second external arcuate surface 168 may extend along a curve or an arc from an end of the second horn 156 to an end of the divider horn 158. As one example, the curve or arc of the second external arcuate surface 168 may have a constant radius. As another example, the curve or arc of the second external arcuate surface 168 may extend approximately 90° so as to direct lubricant substantially perpendicular to the face of the ring gear 82. In such a configuration, an end of the second external arcuate surface 168 that is disposed proximate the divider horn 158 may be disposed substantially perpendicular to the axis 90 while an opposite end that is disposed proximate an end of the second horn 156 may face toward the second reservoir 100 and may be disposed substantially parallel to the axis 90.

As is best shown in FIG. 6, the second external arcuate surface 168 may be entirely disposed on a side of the center plane 166 of the deflector 30 that may be disposed opposite the first horn 154 and the first external arcuate surface 164. As such, the second external arcuate surface 168 may be disposed between the center plane 166 and the second dam 26. Moreover, the second external arcuate surface 168 may be disposed opposite the first external arcuate surface 164. In addition, the second external arcuate surface 168 may have mirror symmetry with respect to the first external arcuate surface 164 and/or the center plane 166.

The divider horn 158 may extend away from the back side 162. For example, the divider horn 158 may be disposed substantially perpendicular to the back side 162 in one or more embodiments. The divider horn 158 may also be disposed substantially perpendicular with respect to the first horn 154 and the second horn 156. As is best shown in FIG. 6, the divider horn 158 or a portion thereof may be disposed directly above the teeth 92 of the ring gear 82. In addition, the divider horn 158 may be disposed directly above the axis 90 and may be disposed substantially perpendicular to the axis 90. The divider horn 158 may extend from the upper surface 150 to the lower surface 152 and may be bisected by the center plane 166. The divider horn 158 may direct lubricant 62 that is splashed by the ring gear 82 toward the first external arcuate surface 164 and the second external arcuate surface 168. As such, the divider horn 158 may divide or separate the lubricant 62 that is splashed by the ring gear 82 such that the lubricant 62 may be directed toward different lubricant reservoirs 100.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    an axle housing having a center portion that receives a differential and an arm portion that extends from the center portion and receives an axle shaft; and
    a dam that is disposed in the axle housing and that cooperates with the arm portion to define a reservoir that retains lubricant in the arm portion, wherein the dam has a dam panel that extends from the arm portion and a brace panel that extends from the dam panel to the center portion, wherein lubricant flows from the reservoir to the center portion by flowing through an orifice in the dam panel and around the brace panel.

2. The axle assembly of claim 1 wherein the dam is completely disposed below the axle shaft.

3. The axle assembly of claim 1 wherein the differential has a ring gear and the brace panel does not extend under the ring gear.

4. The axle assembly of claim 1 wherein the axle housing has a bearing support that receives a roller bearing assembly that rotatably supports the differential, wherein the dam is spaced apart from the bearing support and the brace panel terminates directly below the bearing support.

5. The axle assembly of claim 1 wherein the dam panel has a first dam panel end that is disposed in the arm portion and a second dam panel end that is disposed opposite the first dam panel end, and the brace panel has a first brace panel end that extends from the second dam panel end and a second brace panel end that is disposed opposite the first brace panel end, wherein the second brace panel end is disposed on the center portion.

6. The axle assembly of claim 5 wherein the brace panel has a generally cross-shaped configuration that includes a pair of side arms, wherein the side arms engage the axle housing to inhibit lateral movement of the dam with respect to the axle housing.

7. The axle assembly of claim 6 wherein the side arms are disposed between and spaced apart from the first brace panel end and the second brace panel end.

8. The axle assembly of claim 6 wherein lubricant that exits the reservoir through the orifice flows under the pair of side arms.

9. The axle assembly of claim 1 wherein the differential includes a ring gear that is disposed in the center portion and the axle assembly further comprises a lubricant conduit that extends from the center portion to the arm portion and delivers the lubricant to the reservoir, wherein the lubricant conduit has a plurality of inlets that receive lubricant that is sprayed by the ring gear.

10. The axle assembly of claim 9 wherein the ring gear has a set of teeth arranged around an axis, wherein the plurality of inlets is disposed above the set of teeth.

11. An axle assembly comprising:
    an axle housing having a center portion that receives a differential that has a ring gear that is rotatable about an axis, a first arm portion that extends from the center portion and that receives a first axle shaft, and a second arm portion that extends from the center portion and receives a second axle shaft;
    a first dam that is disposed in the axle housing and that cooperates with the first arm portion to define a first reservoir that retains lubricant in the first arm portion;
    a second dam that is disposed in the axle housing and that cooperates with the second arm portion to define a second reservoir that retains lubricant in the second arm portion; and
    a deflector that is disposed in the center portion above the ring gear, wherein the deflector has a divider horn that is at least partially defined by a first external arcuate surface that directs lubricant that is sprayed by the ring gear toward the first reservoir and a second external arcuate surface that is disposed opposite the first external arcuate surface and that directs lubricant that is sprayed by the ring gear toward the second reservoir, wherein the first and second external arcuate surfaces have mirror symmetry with respect to a center plane that bisects the divider horn.

12. The axle assembly of claim 11 wherein the divider horn is disposed directly above teeth of the ring gear.

13. The axle assembly of claim 11 wherein the divider horn is disposed directly above the axis.

14. The axle assembly of claim 11 wherein the center plane is disposed substantially perpendicular to the axis.

15. The axle assembly of claim 11 wherein the deflector has a first horn and a second horn that is disposed opposite the first horn.

16. The axle assembly of claim 15 wherein the divider horn is disposed substantially perpendicular to the first horn and the second horn.

17. The axle assembly of claim 15 wherein the first external arcuate surface extends from an end of the divider horn to an end of the first horn and the second external arcuate surface extends from the end of the divider horn to an end of the second horn.

18. The axle assembly of claim 11 wherein the deflector has an upper surface that is disposed proximate the axle housing and a lower surface is disposed opposite the upper surface and that faces toward the ring gear, wherein at least a portion of the lower surface is disposed along an arc.

19. The axle assembly of claim 18 wherein the arc of the lower surface is radially disposed with respect to the axis.

\* \* \* \* \*